United States Patent [19]

Washida et al.

[11] 4,209,705

[45] Jun. 24, 1980

[54] IMAGE INTENSIFIER WHOSE INPUT SCREEN PHOSPHOR LAYER IS DIVIDED INTO LIGHT GUIDING MOSAIC BLOCKS BY METAL PROTRUSIONS

[75] Inventors: Hiroshi Washida, Kawasaki; Tomiya Sonoda, Machida; Yuzo Nakamura, Kawasaki, all of Japan

[73] Assignee: Tokyo Shibaura Electric Company, Limited, Kawasaki, Japan

[21] Appl. No.: 885,121

[22] Filed: Mar. 10, 1978

[30] Foreign Application Priority Data

Mar. 14, 1977 [JP] Japan ........................ 52-27106

[51] Int. Cl.[2] ........................ G01T 1/20

[52] U.S. Cl. ........................ 250/486; 250/483

[58] Field of Search ........................ 250/483, 486, 487, 488, 250/213 VT; 427/157, 158

[56] References Cited

U.S. PATENT DOCUMENTS

| | | | |
|---|---|---|---|
| 3,041,456 | 6/1962 | MacLeod | 250/486 |
| 3,089,956 | 5/1963 | Harper | 250/486 |
| 3,783,297 | 1/1974 | Houston | 250/486 |
| 3,825,763 | 7/1974 | Cornelis et al. | 250/486 |
| 3,962,582 | 6/1976 | Greschat et al. | 250/486 |
| 4,011,454 | 3/1977 | Lubowski et al. | 250/486 |

*Primary Examiner*—Bruce C. Anderson
*Attorney, Agent, or Firm*—Oblon, Fisher, Spivak, McClelland & Maier

[57] ABSTRACT

An image intensifier having a CsI phosphor input screen. The input screen comprises a substrate of aluminum, a plurality of small mosaic blocks secured on the substrate, a plurality of grooves intervening between adjacent blocks, a plurality of metallic protrusions formed on the grooves, a plurality of phosphor blocks grown on the mosaic blocks and optically isolated from each other by the protrusions and a photocathode deposited on the phosphor blocks. The metallic protrusions cause a phosphor layer when deposited on the mosaic blocks to divide without cracking into the plurality of phosphor blocks. The upper surface of the divided layer is even, permitting the photocathode film to be deposited thereon.

13 Claims, 5 Drawing Figures

IMAGE INTENSIFIER WHOSE INPUT SCREEN PHOSPHOR LAYER IS DIVIDED INTO LIGHT GUIDING MOSAIC BLOCKS BY METAL PROTRUSIONS

BACKGROUND OF THE INVENTION

1. Field of The Invention

This invention relates to an image intensifier converting an X- or γ- ray image into a visible image and more particularly to an improvement of an input screen of the image intensifier.

2. Brief Description of The Prior Art

An image intensifier converting high energy radiations such as γ-ray or X-rays into bright visible rays comprises and input screen converting the image of the high energy radiations into a photoelectron image and an output screen converting the photoelectron image into a visible image.

It is desirable that the visible image has high resolution which depends mainly upon converting fidelity of the input screen.

The input screen has a substrate usually made of aluminum which transmits effectively such radiations. On the substrate an alkali halide phosphor layer luminescing effectively by the radiation is formed by vacuum deposition. Further on the phosphor layer a photocathode for example cesium antimonide (Sb-Cs) sensitive to the luminescence of the phosphor is deposited.

Hitherto, to improve the resolution of the input screen, a cracked phosphor screen having a plurality of phosphor blocks (a bundle of columnar crystals) separated by cracks from each other is known. In this screen light generated in a phosphor block is scattered only within own block and cannot travel to other blocks. Namely each block (not columnar crystal) has light guiding effect. This phorphor screen is prepared by depositing a phosphor material of cesium iodide on an aluminum substrate and thereafter heating them to generate cracks in the deposited phosphor by means of a difference of thermal expansion coefficients between the substrate and the phosphor.

However this input screen has following drawbacks:

(1) As cracks are generated by a strain caused by a difference between the temperature of the substrate and that of the surface of the phosphor layer which is higher than the former, they are liable to be generated from the upper surface of the phosphor layer. Consequently it is difficult that cracks reach near the substrate. Because phosphor blocks formed by cracks generated from substrate's side are few, light guiding effect of the phosphor layer is insufficient. Resolution of the X-ray image intensifier having such input screen is therefore 28–30 lp/cm.

(2) As cracks generated by heat treatment of the screen, it is difficult to obtain the input screen having stable quality.

A method comprising a step of impressing a metallic gauze (e.g. copper gauze) upon an aluminum substrate and a step of depositing cesium iodide on the gauze thereby making a phosphor layer composed of phosphor blocks is well known as another method for making a cracked phosphor layer. However this method has some disadvantages.

(1) Because the surface of the phosphor layer becomes uneven owing to depressions of the phosphor surface corresponding to the meshes of the gauze, this uneveness affects badly the characteristics of a photocathode deposited on the surface.

(2) It is difficult to impress the metallic gauze upon the substrate without generating any folds because the substrate is normally domed.

A phosphor layer composed of a plurality of phosphor blocks (a bundle of columnar crystals) which are deposited on a gauze-like uneven surface of a substrate prepared by conventional photoetching technique is another prior art for obtaining high resolution. However, because separation between adjacent blocks is not distinct, light guiding effect is insufficient. Moreover uneveness of upper surface of the phosphor layer has a bad influence upon characteristics of a photocathode deposited on the layer.

SUMMARY OF THE INVENTION

Accordingly an object of the present invention is to provide an image intensifier having a novel input screen whose resolution is remarkably improved.

An X-ray image intensifier having an input screen comprising a substrate, a plurality of mosaic blocks formed on one surface of the substrate and separated from each other by fine grooves, a phosphor layer composed of a plurality of phosphor blocks deposited on respective mosaic blocks and optically isolated from each other and a photocathode prepared on the phosphor layer through a barrier layer has been offered in commonly assigned U.S. Patent Application Ser. No. 794,025. The present invention is a more improved version of above mentioned invention. Namely an image intensifier according to this invention has an input screen comprising a substrate, a plurality of grooves dividing an insulator layer formed on one surface of the substrate into a plurality of mosaic blocks, a plurality of dividing members protruding at the bottoms of the grooves, a phosphor layer composed of a plurality of phosphor blocks corresponding to the mosaic blocks and extending substantially perpendicular to the surface and a photocathode deposited directly or indirectly on the phosphor layer.

DETAILED DESCRIPTION OF THE PREFERRED EMBODIMENTS

Figure 1:
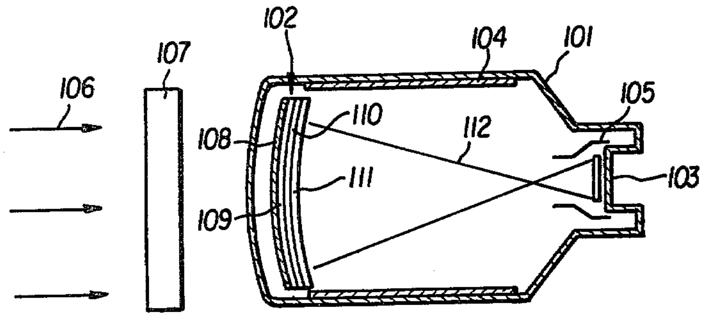
FIG. 1 is a cross-section of an image intensifier embodying this invention.

FIG. 1 shows an X-ray image intensifier embodying this invention. In a glass envelope 101, an input screen 102 is secured at one end thereof. At the other end is located an output screen 103. Between the input screen 102 and the output screen 103 are successively arranged a focusing electrode 104 and an accelerating electrode 105.

When X-rays 106 are applied to the object 107, an X-ray image spatially modulated owing to the X-ray absorption distribution of the object 107 penetrates the envelope 101 and reaches a phosphor layer 109 of the input screen 102 to emanate light. The light emanated passes through a barrier layer 110 deposited on the layer 109 and thereafter emits photoelectrons 112 from a photocathode 111 provided on the barrier layer 110. Photoelectrons 112 generate an optical image at the output screen 103 several thousand times brighter than that formed at the input screen after being accelerated by the focusing electrode 105.

Figure 2:
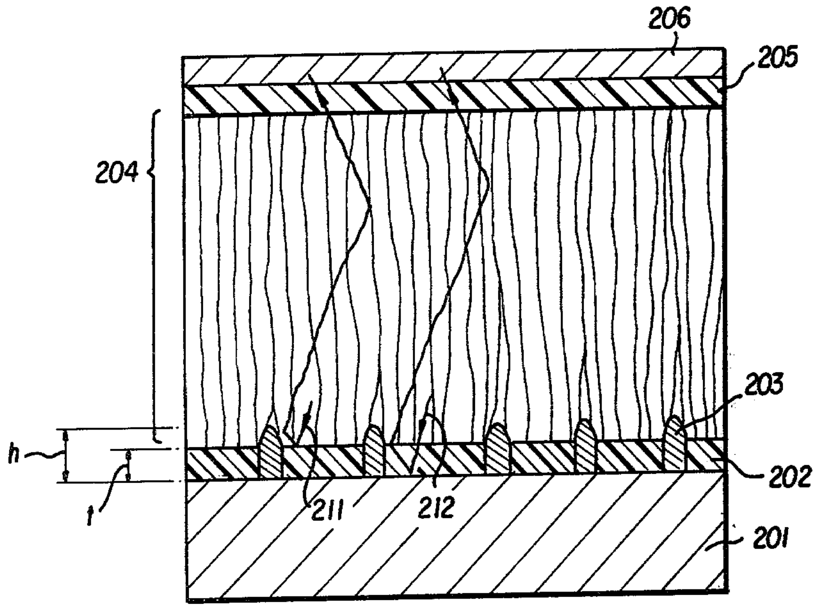
FIG. 2 is an enlarged cross-section of a part of an input screen for an image intensifier by one embodiment of this invention.

FIG. 2 is a part of an enlarged cross-section of the input screen of the image intensifier shown in FIG. 1. On one surface of a substrate 201 are formed a plurality of mosaic blocks 202. Between adjacent blocks 202 are a plurality of elongated metal protrusions 203. On respective mosaic blocks 202 are deposited a plurality of phosphor blocks composed of a bundle of columnar crystals of alkali halide such as cesium iodide or potassium iodide. These blocks form a phosphor layer 204 on which a barrier layer 205 is deposited. A photocathode 206 is deposited on the barrier layer 205. It is preferable that the height (h) of the metallic protrusions 203 is equivalent to or larger than the thickness (t) of the mosaic blocks 202. The barrier layer 205 may be omissible.

In this input screen 102, about a half of fluorescence emanated by excitation of X-rays travels toward the substrate. Reflectance of the substrate effects significantly upon the brightness of the image intensifier, because it influences the conversion efficiency of the input screen. A part 211 of fluorescence reflected by the mosaic block is again reflected by the portion of metallic protrusions 203 higher than the mosic block 202, thereby dispersion of the fluorescence toward lateral direction is effectively prevented. On the other hand, a part 212 of the fluorescence reflected by the substrate 201 after passing through the mosaic block 202 is also reflected by the metallic protrusions 203 and does not disperse laterally. Though reflection of the fluorescence at the side wall of the phosphor block occurs owing to the difference between the index of refraction of the phosphor and that of vacuum even though the metallic protrusions are not used, it is lower than that of the metallic protrusions 203. Therefore the resolution of the image intensifier using this input screen is more ameliorated. The resolution is improved by about 3 lp/cm.

Figure 5:
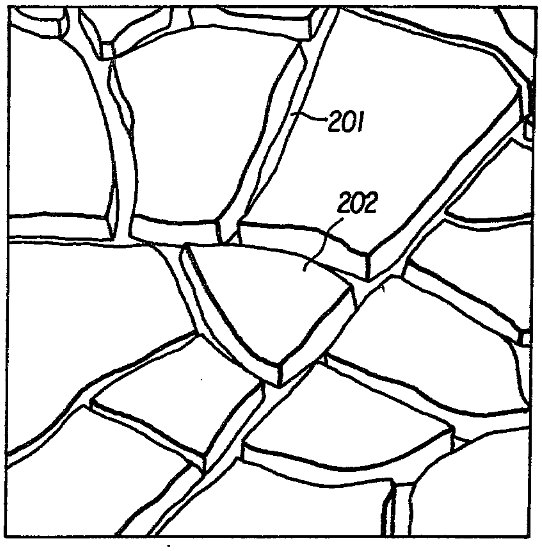
FIG. 5 is an enlarged perspective view of the mosaic blocks of one embodiment of this invention.

By the aid of FIG. 2, one embodiment of the present invention will be explained. One surface of an aluminum substrate 0.5 mm thick 201 on which a phosphor layer is to be deposited is subject to anodizing treatment. For example conditions of the anodizing treatment are as follows:

positive electrode . . . the substrate 201
counter electrode . . . an aluminum plate
electrolyte . . . 5% oxalic acid
current density . . . 1 A/cm$^2$
operating time . . . 2 hours Then, the anodized substrate is treated in boiled water for 2 hours to have an aluminum oxide layer containing crystal water on its surface. Next the substrate is subject to heat treatment at a temperature equal to or higher than 250° C. and consequently mosaic blocks 202 divided by fine grooves are formed at the surface. FIG. 5 shows an enlarged perspective view of the mosaic blocks thus obtained. In this case width of the groove is 3 to 7 microns, distance between adjacent grooves is 50 to 100 microns and depth of the groove i.e. thickness of the anodized layer is about 10 microns. On the bottoms of the fine grooves are formed very thin films of aluminum oxide, whose resistivity are very smaller than that of the mosaic blocks 202. Accordingly, when a metal such as copper is plated on said substrate, the metal is selectively plated only on the grooves to make elongated metallic protrusions which divide respective mosaic blocks 202. Copper plating is done by mean of conventional method. Height (h) of the protrusions 203 is controllable by changing the condition of plating. Height (h) equal to or larger than the thickness of the aluminum oxide layer (for example 15 microns) is prefered. On the substrate having above-mentioned structure is deposited a phosphor layer of cesium iodide having a thickness of about 150 microns. As the phosphor layer is grown to have a plurality of phosphor blocks which are separated from each other by the metallic protrusions, heat treatment cracking the phosphor layer is not necessary. Furthermore, the surface of the phosphor layer becomes even. On the surface of the phospher layer is deposited an aluminum oxide film of 0.01 to 1 micron (e.g. 500 angstroms) in thickness as a barrier layer. A photocathode 206 of for example cesium antimonide is formed on the barrier layer.

As the input screen mentioned above has mosaic phosphor blocks grown from the substrate's side, light guiding effect of these blocks is greatly improved. Moreover the surface of the phosphor layer on which the photocathode is formed is even. These facts result in improvement of the resolution (about 3 lp/cm)

Another embodiment which is an amelioration of the embodiment mentioned above is described below. As material for mosaic blocks, molybdenum oxide or chromium oxide may be used. However these materials have essentially very low reflectance. On the other hand when aluminum oxide is used, its reflectance is decreased largely during successive chemical treatments. Therefore brightness of an image intensifier employing such input screen is extremely deteriorated. To solve these problems, the upper surface of the mosaic blocks is covered by a bright reflective metal film such as aluminum. As the result, the reflectance becomes 85 to 90% so that the fluorescence generated in the phosphor layer effectively travels to the photocathode to emit photoelectrons.

Chemical treating agent for making mosaic blocks is liable to remaining in the blocks or condense at the bases of the blocks. The agent left in the blocks reacts with the alkali halide phosphor layer directly deposited on the blocks and may generates stains or blots thereat. The metal film covering the mosaic blocks protects the phosphor layer and prevents such stains of blots from being generated. Moreover adhesion of the phosphor layer to the mosaic blocks increases because the surface thereof is kept clean.

Metallic protrusions protruding beyond the surface of the mosaic blocks to divide them also divide the alkali halide layer deposited thereon into a plurality of phosphor blocks corresponding to the respective mosaic blocks. The input screen mentioned above has high resolution because of light guiding effect. Still more, brightness is increased by 30 to 40 percents of the conventional tube.

Figure 3:
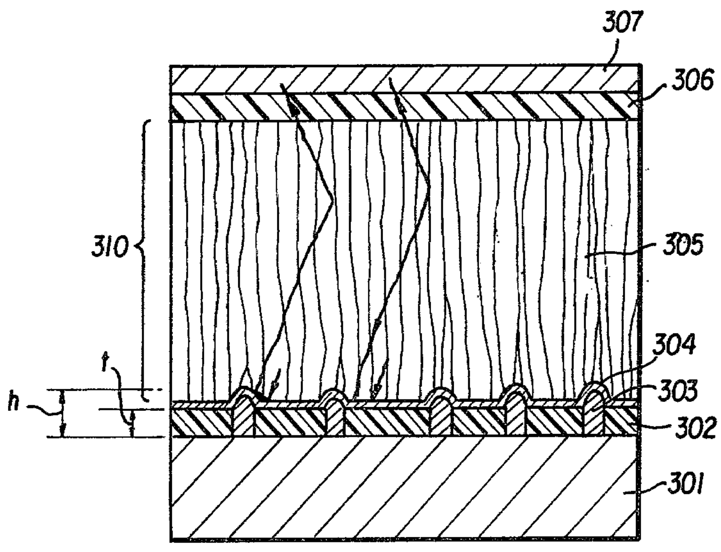
FIG. 3 is an enlarged cross-section of a part of an input screen for an image intensifier by another embodiment of this invention.

FIG. 3 shows an enlarged cross-section of this embodiment. One surface of an aluminum substrate 0.5 mm thick 301 on which a phosphor layer is to be deposited is subject to anodizing treatment. For example the conditions of the anodizing treatment are as follows:

positive electrode . . . the substrate 301 counter electrode . . . an aluminum plate
electrolyte . . . 3% oxalic acid
current density . . . 1 $A/cm^2$
operating time . . . 2 hours Then, the anodized substrate is treated in boiled water for 2 hours to have an aluminum oxide layer containing crystal water on its surface. Next the substrate is subject to heat treatment at a temperature equal to or higher than 250° C. and consequently mosaic blocks 302 divided by fine grooves are formed at the surface. Width of the grooves is 3 to 7 microns, distance between adjacent grooves is 50 to 100 microns, and depth of the groove i.e. thickness of the anodized layer is about 10 microns. Subsequently a metal such as copper is plated. The metal is selectively plated only on the grooves to make elongated metallic protrusions 303 which divide respective mosaic blocks 302. Height (h) of the protrusion 303 is controllable by changing the condition of plating. Preferably the value of h is equal to or larger than the thickness of the aluminum oxide layer (e.g. 15 microns). After that the mosaic blocks 302 and the metallic protrusions 303 are covered with an aluminum layer 1 micron thick by conventional vacuum deposition. By this treatment the reflectance of the substrate increases by 30 percents. On the substrate thus treated is deposited a phosphor layer of cesium iodide having a thickness of about 150 microns. As the phosphor layer 310 is grown to have a plurality of phosphor blocks 305 which are separated from each other by the metallic protrusions, heat treatment for cracking the phosphor layer is not necessary. Furthermore, the surface of the phosphor layer becomes even. On the surface is then deposited an aluminum oxide film having 0.01 to 1 micron (e.g. 500 angstroms) in thickness which is served as barrier layer 306. A photocathode 307 of for example cesium antimonide is formed on the barrier layer 306. The improvements in resolution and brightness are 3 lp/cm and 20 to 25 percents respectively as compared with the conventional tube.

An input screen of the embodiment of the present invention comprising mosaic blocks of molybdenum oxide deposited electrochemically on an aluminum substrate, grooves separating the blocks from each other, metallic protrusions of copper on the grooves, an aluminum film having 0.5 to 1 micron in thickness over the blocks and the protrusions and a phosphor layer deposited on the aluminum film has 80 percents of reflectance and brightness 3 to 4 times higher than that of the conventional input screen.

In two embodiments mentioned above, stains or blots in the screen decreased remarkably. Further adhesion of the phosphor layer to the substrate was improved.

Figure 4:
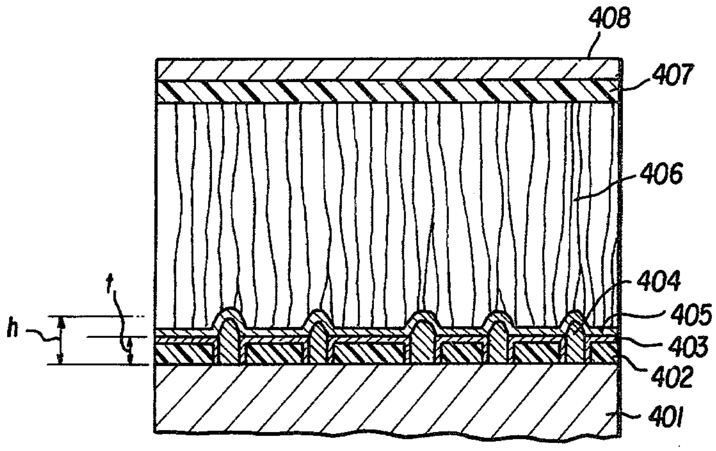
FIG. 4 is an enlarged cross-section of a part of an input screen for an image intensifier by still another embodiment of this invention.

Refering to FIG. 4, several embodiments of the present invention will be explained. chromium is plated as an auxiliary layer 402 on a surface of an aluminum substrate 401 of 0.5 mm in thickness after the surface is degreased and cleaned by etching. Plating conditions are as follows:

electrolyte . . . mixture of 200 to 500 grams/l of chromium tri-oxide and 0.5 to 2 grams/l of sulphuric acid
temperature . . . 30° to 70° C.
current density . . . 10 to 50 $amperes/m^2$ The plated chromium layer having about 10 microns in thickness presents a mosaic structure and serves as the auxiliary layer 402. After cleaned well, the substrate is heated at a temperature between 200° C. and 500° C. The mosaic structure is more fined down by cracking caused by the heat treatment and the surface 403 of the mosaic structure of chromium is oxidized to be inactive. Then the aluminum oxide on the substrate 401 is removed by sodium hydroxide solution. The auxiliary layer 402 having mosaic blocks of 50 to 20 microns in length and 10 microns in thickness and grooves of 1 to 2 microns in width formed by cracking is formed on the substrate. When a metal (for example copper) is plated on the substrate, it is selectively plated only on the grooves to make elongated metallic protrusions 404 dividing respective mosaic blocks. The height (h) of the metallic protrusions 404 is preferably equal to or larger than the thickness (t) of the auxiliary layer 402. After heated, the subtrate is covered with an aluminum layer of 1 micron in thickness by vacuum deposition, which covers thoroughly the auxiliary layer 402 and the metallic protrusions 404 and serves as a reflective layer 405. Subsequently a cesium iodide phosphor layer 406 about 150 microns thick is deposited on the substrate above. The phosphor layer 406 is grown up, divided by the metallic protrusions 404 into a plurality of block elements. Further an aluminum oxide layer 0.01 to 1 (e.g. 0.5) micron thick as a barrier layer 407 and a photocathode layer such as cesium antimonide are successively deposited on the phosphor layer 406. In this embodiment, the mosaic structure in the auxiliary layer can be easily formed and be fined down. The resolution of the intensifier is improved by about 3 lp/cm. Nickel, manganese, rhodium or other metals may be used instead of chromium. Deposition of zirconium prior to that of chromium will aid the latter.

Another embodiment is described below. An aluminum substrate 401 of 0.5 mm in thickness is degreased and cleaned by etching. Then a molybdenum oxide layer is electrochemically deposited on the substrate under the following conditions:

electrolyte . . . mixture of 5 to 30 grams/l of ammonium molybdate and 10 to 50 grams/l of sodium nitrate
temperature, current density or other conditions . . . conventional The molybdenum oxide layer grows upto about 2 microns in thickness. Dimension of a black mosaic element formed by fine cracks is 50 to 20 microns. After washed with flowing water, the substrate is subject to heat treatment at a temperature of 100° to 500° C. and the cracks in the molybdenum oxide layer grow up to have 1 to 2 microns in width. In this embodiment, passivation of the surface is unnecessary. Thereafter metallic protrusions 404, a reflective layer 405, a phosphor layer 406, a barrier layer 407 and a photocathode 408 are successively formed by the same methods described above.

Further embodiment will be explained below. An aluminum substrate 401 of 0.5 mm in thickness is first cleaned. After placing a gauze-like or mosaic mask on that surface of the substrate on which a phorphor layer is to be deposited, silicon di-oxide, magnesium oxide, silicon mono-oxide or other is deposited thereon. Then a mosaic pattern of insulating material is formed. Instead of above method for forming the mosaic pattern, a method comprising a step of depositing a metal such as bismuth titanium or nickel-chromium alloy and a step of oxiding it may be adopted. Thickness of the deposited layer is 0.05 to 0.5 micron. When the substrate is subject to copper plating, copper is deposited only at the places of the substrate which are behind the gause wire, because the insulating mosaic pattern does not present on these places. So the plated copper forms elongated metallic protrusions. Following processes are same as the previous embodiment.

This embodiment has some advantages such as large selection of the material for the auxiliary layer or easy making of the metallic protrusions. Thus the mosaic structure in the auxiliary layer is surely obtained. Therefore this embodiment provides an input screen having high resolution.

What is claimed is:

1. An image intensifier comprising an input screen for converting a radiation image into an electron image;

an electro-optical system for accelerating and focusing the electron image and an output screen for converting the accelerated and focused electron image into a visible image, wherein the input screen comprises:

a substrate;

an insulator layer formed on one surface of the substrate and having a plurality of grooves dividing the insulator layer into a plurality of mosaic blocks;

a phosphor layer deposited on the insulator layer, the upper surface of the phosphor layer being even;

a plurality of protruding dividing members disposed at the bottoms of the grooves in the insulator layer for causing the phosphor layer when deposited on the insulator layer to divide without cracking into a plurality of phosphor blocks corresponding to the mosaic blocks and extending substantially perpendicular to the one surface of the substrate, light generated in one phosphor block being scattered only within the one phosphor block and not travelling to the other phosphor blocks; and a photocathode deposited on the phosphor layer.

2. An image intensifier according to claim 1, wherein the dividing members are elongated metal protrusions.

3. An image intensifier according to claim 1, wherein the substrate is of electrically conductive material.

4. An image intensifier according to claim 1 or 3, wherein the electrically conductive material is aluminum.

5. An image intensifier according to claim 1, 2 or 3, wherein the dividing members are at least partially protruded beyond the upper surface of the mosaic blocks.

6. An image intensifier according to claim 1, wherein a metallic film is deposited on the upper surfaces of the mosaic blocks and the dividing members.

7. An image intensifier according to claim 1, 2 or 3, wherein the dividing members are deposited on the bottoms of the grooves by means of electrochemical method.

8. An image intensifier according to claim 1, wherein the mosaic blocks are made of a material being different from the substrate.

9. An image intensifier according to claim 8, wherein the material is a metal covered by an insulating layer.

10. An image intensifier according to claim 9, wherein the metal is chromium and the insulating layer is chromium oxide.

11. An image intensifier according to claim 6, wherein the metallic film is of aluminum.

12. An image intensifier according to claim 1, 2 or 3, wherein the phosphor layer is of alkali halide.

13. An image intensifier according to claim 1, 2 or 3, wherein the radiation is X-ray.

* * * * *